(12) United States Patent
Seno et al.

(10) Patent No.: US 9,120,946 B2
(45) Date of Patent: Sep. 1, 2015

(54) ACTIVE ENERGY RAY CURING TYPE COMPOSITION, CONTAINER THAT ACCOMMODATES COMPOSITION, INKJET DISCHARGING DEVICE HAVING CONTAINER, AND CURED MATTER

(71) Applicants: Shinya Seno, Kanagawa (JP); Takao Hiraoka, Kanagawa (JP)

(72) Inventors: Shinya Seno, Kanagawa (JP); Takao Hiraoka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/493,555

(22) Filed: Sep. 23, 2014

(65) Prior Publication Data

US 2015/0091986 A1    Apr. 2, 2015

(30) Foreign Application Priority Data

Sep. 27, 2013  (JP) .................. 2013-200802

(51) Int. Cl.
| | | |
|---|---|---|
| *G01D 11/00* | (2006.01) | |
| *C09D 133/10* | (2006.01) | |
| *C08F 2/48* | (2006.01) | |
| *C08L 83/12* | (2006.01) | |
| *C09D 11/30* | (2014.01) | |
| *C08F 222/10* | (2006.01) | |
| *C09D 183/12* | (2006.01) | |
| *C08G 77/46* | (2006.01) | |

(52) U.S. Cl.
CPC ............... *C09D 133/10* (2013.01); *C08F 2/48* (2013.01); *C08F 222/10* (2013.01); *C08L 83/12* (2013.01); *C09D 11/30* (2013.01); *C08F 222/1006* (2013.01); *C08F 2222/104* (2013.01); *C08F 2222/1013* (2013.01); *C08F 2222/1026* (2013.01); *C08F 2222/1093* (2013.01); *C08G 77/46* (2013.01); *C09D 183/12* (2013.01)

(58) Field of Classification Search
CPC ........ C09D 11/06; C09D 11/38; B41J 11/002
USPC .......... 347/85, 95, 96, 100; 106/31.13, 31.27, 106/31.6
See application file for complete search history.

(56) References Cited

U.S. PATENT DOCUMENTS

| 8,801,167 B2 * | 8/2014 | Katoh et al. .................. 347/100 |
| 2007/0037961 A1 | 2/2007 | Oyanagi et al. |
| 2008/0146689 A1 | 6/2008 | Oyanagi et al. |
| 2009/0318580 A1 | 12/2009 | Nakano et al. |
| 2012/0147103 A1 | 6/2012 | Hasegawa et al. |
| 2013/0141505 A1 * | 6/2013 | Ikeda et al. .................. 347/104 |
| 2014/0311380 A1 | 10/2014 | Hiraoka |

FOREIGN PATENT DOCUMENTS

| EP | 1752504 A1 | 2/2007 |
| EP | 1865034 A1 | 12/2007 |
| EP | 1942159 A1 | 7/2008 |
| EP | 2796519 A1 | 10/2014 |
| JP | 2012-140593 | 7/2012 |
| JP | 2013-181114 | 9/2013 |
| JP | 2013-256659 | 12/2013 |
| JP | 2014-070110 | 4/2014 |
| JP | 2014-088539 | 5/2014 |
| WO | WO2014/054763 A1 | 4/2014 |

OTHER PUBLICATIONS

European Search Report dated Nov. 10, 2014 in corresponding European patent application No. 14 18 6635.0.

* cited by examiner

*Primary Examiner* — An Do
(74) *Attorney, Agent, or Firm* — Cooper & Dunham LLP

(57) ABSTRACT

An active energy ray curing type composition contains (meth) acrylic acid ester; and polyether-modified polysiloxane, wherein (meth)acrylic acid ester comprises diethylene glycol dimethacrylate and alkoxy-modified (meth)acrylic acid ester.

20 Claims, 1 Drawing Sheet

ACTIVE ENERGY RAY CURING TYPE COMPOSITION, CONTAINER THAT ACCOMMODATES COMPOSITION, INKJET DISCHARGING DEVICE HAVING CONTAINER, AND CURED MATTER

CROSS-REFERENCE TO RELATED APPLICATION

This patent application is based on and claims priority pursuant to 35 U.S.C. §119 to Japanese Patent Application No. 2013-200802, filed on Sep. 27, 2013 in the Japan Patent Office, the entire disclosure of which is hereby incorporated by reference herein.

BACKGROUND

1. Field of the Invention

The present invention relates to an active energy ray curing type composition, cured matter thereof, a container that accommodates the composition, and an inkjet discharging device having the container.

2. Background Art

Photopolymerizable ink using a (meth)acrylic acid ester is widely known as active energy ray curing type composition.

However, most of monomers for use in conventional photopolymerizable ink are toxic. In particular, (meth)acrylic acid esters, which are inexpensive and easily available, usually have high toxicity about skin sensitization indicating the degree of allergy upon contact with the skin. So far, this problem has not been solved.

So far, several curing type compositions containing (meth)acrylic acid esters and (meth)acrylic amides free from skin sensitization potential have been found allergy have been found.

However, these are required to have better robustness of a cured film of ink by ameliorating durability to scratch and low viscosity in order to avoid problems of ink discharging even when the viscosity of ink is increased by blending various materials such as pigments and additives.

In addition, when forming a solid layer on a substrate (recording medium) utilizing an inkjet method, omission in the formed layer occurs if part of nozzles of an inkjet head is clogged.

SUMMARY

The present invention provides an improved active energy ray curing type composition that contains (meth)acrylic acid ester; and polyether-modified polysiloxane, wherein (meth)acrylic acid ester comprises diethylene glycol dimethacrylate and alkoxy-modified (meth)acrylic acid ester.

BRIEF DESCRIPTION OF THE DRAWINGS

Various other objects, features and attendant advantages of the present invention will be more fully appreciated as the same become better understood from the detailed description when considered in connection with the accompanying drawings, in which like reference characters designate like corresponding parts throughout and wherein.

DETAILED DESCRIPTION

Figure 1:
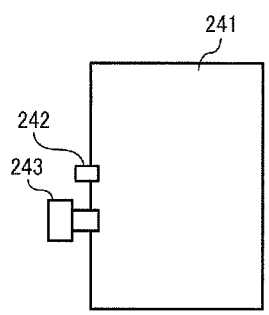
FIG. 1 is a schematic diagram illustrating an example of the ink bag of an ink cartridge according to an embodiment of the present disclosure.

The present invention is to provide an active energy ray curing type composition free from skin sensitization problems, having compatibility between reducing viscosity sufficiently to be applicable as inkjet ink and improving the robustness of a cured film, and capable of compensating ink omission on a substrate caused by non-discharging of ink due to discharging problems of some nozzles of discharging heads.

An active energy ray curing type composition negative for skin sensitization satisfies at least the following (1) or (2):

(1) a compound having a Stimulation Index (SI value) of less than 3, where the Stimulation Index indicates the level of sensitization as measured by a skin sensitization test based on the LLNA (Local Lymph Node Assay); and (2) a compound evaluated as "negative for skin sensitization" or "no skin sensitization" in its MSDS (Material Safety Data Sheet).

Regarding the above (1), the compound having the SI value of less than 3 is considered as negative for skin sensitization as described in literatures, for example, "Functional Material" (Kino Zairyou) 2005, September, Vol. 25, No. 9, p. 55. A lower SI value means a lower level of skin sensitization. Thus, in the present disclosure, a monomer having a lower SI value is preferably used. The SI value of the monomer used is preferably less than 3, more preferably 2 or lower, and even more preferably 1.6 or lower.

The active energy ray curing type composition of the present disclosure is:

1. An active energy ray curing type composition containing (meth)acrylic acid ester; and polyether-modified polysiloxane, wherein (meth)acrylic acid ester comprises diethylene glycol dimethacrylate and alkoxy-modified (meth)acrylic acid ester.

Embodiments of the present disclosure include, but are not limited to, the following 2 to 12 of the active energy ray curing type composition, the container, the inkjet discharging device, and cured matter.

2. The active energy ray curing type composition of 1 mentioned above, having a surface tension of less than 22 mN/m at 25° C.

3. The active energy ray curing type composition of 1 or 2 mentioned above, wherein the total of average polymerization degree of an alkoxy portion of alkoxy-modified (meth)acrylic acid ester is 3 or more.

4. The active energy ray curing type composition of any one of 1 to 3 mentioned above, wherein the total of average polymerization degree of an alkoxy portion of alkoxy-modified (meth)acrylic acid ester is 9 or more.

5. The active energy ray curing type composition of any one of 1 to 4 mentioned above, wherein alkoxy-modified (meth)acrylic acid ester contains at least one of caprolactone-modified dipenta erythritol hexaacrylate, ethylene oxide-modified trimethylol propane trimethacrylate, ethylene oxide-modified bisphenol A diacrylate, polypropylene glycol diacrylate, or ethylene oxide-modified pentaerythritol tetraacrylate.

6. The active energy ray curing type composition of any one of 1 to 5 mentioned above, wherein alkoxy-modified (meth)acrylic acid ester comprises at least one of caprolactone-modified dipenta erythritol hexaacrylate or ethylene oxide-modified trimethylol propane trimethacrylate and at least one of ethylene oxide-modified bisphenol A diacrylate, polypropylene glycol diacrylate, or ethylene oxide-modified pentaerythritol tetraacrylate.

7. The active energy ray curing type composition of any one of 1 to 6 mentioned above, wherein polyether-modified polysiloxane is represented by the following chemical formula 1:

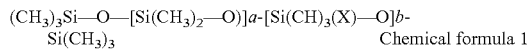
Chemical formula 1

In the chemical formula 1, X represents $R(C_2H_4O)c(C_3H_6O)d$-R', R represents a single bond or an alkylene group, R' represents a hydrogen atom or an alkyl group, a to d each, represent average polymerization degree including a case of c or d being 0.

8. The active energy ray curing type composition of any one of 1 to 7 mentioned above, wherein the content of polyether-modified polysiloxane surpasses 0.1 parts by weight per 100 parts by weight of (meth)acrylic acid ester.

9. The active energy ray curing type composition of any one of 1 to 8 mentioned above, wherein a cured film has a pencil scratch hardness of F or higher as measured according to JIS-K-5600 when the cured film is formed by irradiating a coated film of the active energy ray curing type composition having a thickness of about 40 μm with an amount of light of 1.2 J/cm² with an illuminance of 0.3 W/cm² in a wavelength range corresponding to the ultraviolet A range. 10. A container to accommodate the polymerizable ink of 1 mentioned above.

11. An inkjet discharging device having the container of 10 mentioned above.

12. Cured matter formed by using the active energy ray curing type composition of 1 mentioned above.

In the present disclosure, as the active energy ray curing type composition, a layer formed by photocuring a monomer composition prepared by a combination of at least diethylene glycol dimethacrylate and alkoxy-modified (meth)acrylic acid ester in such a manner that inkjet discharging is possible has a sufficient robustness. Furthermore, leveling property is improved by mixing a polyether-modified polysiloxane compound, so that no deficiency occurs for ink omission upon ink application, and the thus-obtained curd film is uniform, smooth, and excellent looking.

Since diethylene glycol dimtheacrylate is free from skin sensitization problems and has a low viscosity, it is excellent as raw material of active energy ray curing type composition usable as inkjet ink. Although cured layers are hard and excellent to protect the surface thereof, they are not flexible. For this reason, when an external force is applied to a cured layer upon processing such as hole-punching and cutting, the layer tends to be cracked and chipped off.

For this reason, alkoxy-modified (meth)acrylic acid ester is mixed. There is no specific limit to the selection of alkoxy-modified (meth)acrylic acid ester. Specific examples thereof include, but are not limited to, caprolactone-modified dipenta erythritol hexaacrylate, ethylene oxide-modified trimethylol propane trimethacrylate, ethylene oxide-modified bisphenol A diacrylate, polypropylene glycol diacrylate, or ethylene oxide-modified pentaerythritol tetraacrylate. There contribute to improve the robustness of a formed layer.

The content of diethylene glycol dimethacrylate is preferably from 20% by weight to 80% by weight, more preferably from 30% by weight to 75% by weight, and particularly preferably from 40% by weight to 70% by weight. The content of alkoxy-modified (meth)acrylic acid ester in the composition of the present disclosure is preferably from 10% by weight to 70% by weight, more preferably from 20% by weight to 60% by weight, and particularly preferably from 30% by weight to 50% by weight in terms of cracking, etc. of coated cured matter.

In addition, the total n of the average polymerization degree of alkoxy portion of alkoxy-modified (meth)acrylic acid ester is preferably 3 or higher and more preferably 9 or higher.

When n is 3 or greater, in addition to improvement of the robustness of a formed layer, the formed layer tends to be prevented from cracking or chipping-off upon processing such as punch-hole of cutting to a substrate to a substrate after the layer is formed. For example, by adding alkoxy-modified (meth)acrylic acid ester having an n of 9 or greater, such as ethyleneoxide modified bisphenol A diacrylate (n=10), polypropylene glycol diacrylate (n=12), or ethyleneoxide-modified pentaerythritol tetraacrylate (n=35), in a suitable amount, cracking or chipping-off of a coated layer upon processing is prevented without degrading the robustness of the layer.

Moreover, it is particularly preferable to use with caprolactone-modified dipentaerythritol hexaacrylate and ethylene oxide-modified trimethylol propane trimethacrylate.

However, since the alkoxy portion of alkoxy-modified (meth)acrylic acid ester having an n of 3 or greater, in particular 9 or greater, has a large size, the molecular weight thereof increases, resulting in highly viscous composition. For this reason, in order to use the active energy ray curing type composition as inkjet ink, it is preferable that the ink has properties meeting with required specifications of an inkjet ejection (discharging) head used.

Various ejection heads are marketed from many manufacturers, and some of them have large ejection power to eject an ink having high viscosity and wide thermostat.

In this context, it is preferable to use an ink having a viscosity of from 2 mPa·s to 150 mPa·s at 25° C. and, more preferable, from 5 mPa·s to 18 mPa·s assuming 25° C.

However, the thermostat of the ejection head can be used. When the viscosity is too high at 25° C., the head may be heated when necessary to make the ink have lower viscosity. When heated to 45° C. or 60° C., the ink preferably has a viscosity of from 5 mPa·s to 18 mPa·s thereat.

In this context, when adding alkoxy-modified (meth) acrylic acid ester having an n of 3 or greater and in particular 9 or greater, it is preferable that the amount of the ester is from 5 parts by weight to 70 parts by weight to 100 parts by weight to the total amount of monomer compositions.

In addition, there is no specific limit to the selection of polyether-modified polysiloxane. In terms of leveling property and robustness of a formed layer, the following represented by the following chemical formula 1 is preferable.

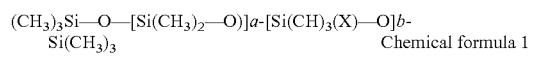
Chemical formula 1

In the chemical formula 1, X represents $R(C_2H_4O)c(C_3H_6O)d$-R', where R represents a single bond or an alkylene group, R' represents a hydrogen atom or an alkyl group, a to d 15 each, represent average polymerization degree including a case of c or d being 0.

There is no specific limit to the addition amount of polyether-modified polysiloxane materials. The amount preferably surpasses 0.1 parts by weight and is more preferably from 0.1 parts by weight to 5 parts by weight, and particularly preferably from 0.2 parts by weight to 2 parts by weight.

The following (meth)acrylates and (meth)acryl amides can be used together unless a resulting ink has a problem, even if they have a problem of skin sensitization in some degrees when used alone, or skin sensitization thereof is not confirmed.

Specific examples thereof include, but are not limited to, ethylene glycol di(meth)acrylate, hydroxy pivalic acid neopentyl glycol di(meth)acrylate, γ-butylolactone acrylate, isobornyl(meth)acrylate, formalized trimethylol propane mono(meth)acrylate, polytetratnethylene glycol di(meth) acrylate, trimethylol propane (meth)acrylic acid salicylic acid ester, diethylene glycol di(meth)acrylate, triethylene glycol di(meth)acrylate, tetraethylene glycol di(meth)acrylate, polyethylene glycol di(meth)acrylate [($CH_2$=CH—CO—($OC_2H_4$)n-OCOCH=$CH_2$ (n=4)], polyethylene glycol di(meth)acrylate [($CH_2$=CH—CO—($OC_2H_4$)n-OCOCH=$CH_2$ (n=9)], polyethylene glycol di(meth)acrylate [($CH_2$=CH—CO—($OC_2H_4$)n-OCOCH=$CH_2$ (n=14)], polyethylene glycol di(meth)acrylate [($CH_2$=CH—CO—($OC_2H_4$)n-OCOCH=$CH_2$ (n=23)], dipropylene glycol di(meth)acrylate, tripropylene glycol di(meth)acrylate, polypropylene glycol dimethacrylate [($CH_2$=C($CH_3$)—CO—($OC_3H_6$)n-OCOC($CH_3$)=$CH_2$ (n=7)], 1,3-butane diol di(meth)acrylate, 1,4-butane diol di(meth)acrylate, 1,6-hexane diol di(meth)acrylate, 1,9-nonene diol di(meth)acrylate, neopentyl glycol di(meth)acrylate, tricyclodecane dimethanol di(meth)acrylate, propylene oxide-modified bisphenol A di(meth)acrylate, 1,6-hexane dioldi(meth)acrylate, polyethylene glycol di(meth)acrylate, dipenta erythritol hexa(meth)acrylate, methacryloyl morphorine, 2-hydroxypropyl(meth) acryl amide, propylene oxide-modified tetramethylol methane tetramethacrylate, dipentaerythritol hydroxypenta(meth)acrylate, caprolactone-modified dipentaerythritol hydroxy penta(meth)acrylate, ditrimethylol propane tetra(meth)acrylate, pentaerythritol tetra(meth)acrylate, trimethylol propane triacrylate, ethylene oxide-modified trimethylol propane tri(meth)acrylate, propylene oxide-modified trimethylol propane tri(meth)acrylate, caprolactone-modified trimethylol propane tri(meth)acrylate, pentaetythritol tri(meth)acrylate, tris(2-hydroxyethyl)isocyanulate tri(meth)acrylate, ethoxylated neopentyl glycol di(meth)acrylate, propylene oxide-modified neopentyl glycol di(meth)acrylate, propylene oxide-modified glyceryl tri(meth)acrylate, polyester di(meth)acrylate, polyester tri(meth)acrylate, polyester tetra(meth)acrylate, polyester penta(meth)acrylate, polyester poly(meth)acrylate, N-vinylcaprolactam, N-vinyl pyrrolidone, N-vinyl formamide, polyurethane di(meth)acrylate, polyurethanetri(meth)acrylate, polyurethane tetra(meth)acrylate, polyurethane penta(meth)acrylate, and polyurethane poly(meth)acrylate.

Photoradical polymerization initiators are preferably used for the active energy ray curing type composition of the present disclosure. The (meth)acrylic acid ester and the (meth)acryl amide are known to have an ionic polymerizability as well. The ionic polymerization initiators are generally expensive and generate a slight amount of strong acid or strong alkali even in the state where they are not irradiated with light. Therefore, it is suitable to take special cares such as imparting acid resistance and alkali resistance to an ink supply channel of an inkjet coating system, imposing limitation on the choice of members constituting the inkjet coating system.

By contrast, the active energy ray curing type composition of the present disclosure can use a photoradical polymerization initiator that is inexpensive and generates no strong acid or strong alkali. Therefore, it is possible to produce an ink at low cost, and also it is easy to choose members of an inkjet coating system. When using a quite high energy light source, such as electron beams, α rays, β rays, γ rays, or X rays, polymerization reaction can proceed without polymerization initiator. Since this is a conventionally known matter, the equipment is very expensive and the maintenance is complicated, this not described in detail in the present disclosure.

The photoradical polymerization initiators include, but are not limited to, a self-cleaving photopolymerization initiator and a hydrogen-abstracting polymerization initiator.

These may be used alone, or in combination.

Specific examples of the self-cleaving photopolymerization initiator include, but are not limited to, 1-hydroxy-cyclohexyl-phenyl-ketone, 2-hydroxy-2-methyl-1-phenylpropan-1-one, 1-[4-(2-hydroxyethoxy)-phenyl]-2-hydroxy-2-methyl-1-propan-1-one, 2-hydroxy-1-{4-[4-(2-hydroxy-2-methylpropionyl)benzyl]phenyl}-2-methyl-1-propan-1-one, phenylglyoxylic acid methyl ester, 2-methyl-1-[4-(methylthio)phenyl]-2-morpholinopropan-1-one, 2-benzyl-2-dimethylamino-1-(4-morpholinophenyl)butanone-1,2-dimethylamino-2-(4-methylbenzyl)-1-(4-morpholin-4-yl-phenyl) butan-1-one, bis(2,4,6-trimethylbenzoyl)phenyl phosphine oxide, bis(2,6-dimethoxybenzoyl)-2,4,4-trimethyl-pentylphosphine oxide, 2,4,6-trimethylbenzoylphosphine oxide, 1,2-octanedion-[4-(phenylthio)-2-(o-benzoyloxime)], ethanone-1-[9-ethyl-6-(2-methylbenzoyl)-9H-carbazol-3-yl]-1-(O-acetyloxime) and [4-(methylphenylthio)phenyl]phenylmethanone.

Specific examples of the hydrogen-abstracting polymerization initiator include, but are not limited to, benzophenone compounds such as benzophenone, methylbenzophenone, methyl-2-benzoylbenzoate, 4-benzoyl-4'-methyldiphenyl sulfide and phenylbenzophenone; and thioxanthone compounds such as 2,4-diethylthioxanthone, 2-chlorothioxanthone, isopropylthioxanthone and 1-chloro-4-propylthioxanthone.

Amines can be used in combination as polymerization accelerator.

Specific examples thereof include, but are not limited to, p-dimethylaminobenzoate, 2-ethylhexyl p-dimethylaminobenzoate, methyl p-dimethylaminobenzoate, 2-dimethylaminoethyl benzoate and butoxyethyl p-dimethylaminobenzoate.

The active energy ray curing type composition may be transparent without containing a colorant, and may include a colorant when necessary. When the active energy ray curing type composition is desired to be colorless or white, materials having less color are preferably used other than the polymerization initiator, the polymerization accelerator and the colorant.

Known inorganic pigments and organic pigments can be used as a colorant coloring the active energy ray curing type composition.

Carbon black manufactured by a furnace method or a channel method can be used as black pigment.

Pigment Yellow pigments can be used as yellow pigments. Specific examples thereof include, but are not limited to, Pigment Yellow 1, Pigment Yellow 2, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 75, Pigment Yellow 83, Pigment Yellow 93, Pigment Yellow 95, Pigment Yellow 97, Pigment Yellow 98, Pigment Yellow 114, Pigment Yellow 120, Pigment Yellow 128, Pigment Yellow 129, Pigment Yellow 138, Pigment Yellow 150, Pigment Yellow 151, Pigment Yellow 154, Pigment Yellow 155, and Pigment Yellow 180.

Pigment Red pigments can be used as magenta pigments.

Specific examples thereof include, but are not limited to, Pigment Red 5, Pigment Red 7, Pigment Red 12, Pigment Red 48 (Ca), Pigment Red 48 (Mn), Pigment Red 57 (Ca), Pigment Red 57:1, Pigment Red 112, Pigment Red 122, Pigment Red 123, Pigment Red 168, Pigment Red 184, Pigment Red 202, and Pigment Violet 19.

Pigment Blue pigments can be used as cyan pigments.

Specific examples thereof include, but are not limited to, Pigment Blue 1, Pigment Blue 2, Pigment Blue 3, Pigment Blue 15, Pigment Blue 15:3, Pigment Blue 15:4. Pigment Blue 16, Pigment Blue 22, Pigment Blue 60, Pat Blue 4, and Pat Blue 60.

Specific examples of white pigments or colorless fillers to reform physical properties include, but are not limited to, sulfates of alkaline earth metals such as barium sulfide, carbonates of alkaline earth metals such as calcium carbonates, silicas such as fine powder of silicic acid and synthetic silicate, calcium silicate, alumina, hydrated alumina, titanium oxide, zinc oxide, talc, and clay.

Considering properties, other inorganic pigments and organic pigments can be optionally used.

Further, a polymerization inhibitor or a polar group-containing polymer pigment dispersing agent (e.g., 4-methoxy-1-naphthol, methylhydroquinone, hydroquinone, t-butylhydroquinone, di-t-butylhydroquinone, methoquinone, 2,2'-dihydroxy-3,3'-di($\alpha$-methylcyclohexyl)-5,5'-dimethyldiphenylmethane, p-benzoquinone, di-t-butyl diphenylamine, and 9,10-di-n-butoxyanthracene, 4,4'-[1,10-dioxo-1,10-decandiylbis(oxy)]bis[2,2,6,6-tetramethyl]-1-piperidinyloxy) can be optionally used.

When the active energy ray curing type composition of the present disclosure is used as inkjet ink, it can be accommodated in a container, which can be used as ink cartridge.

Due to such an ink cartridge, there is no need to directly touch ink during operations such as ink change, which makes users free from concerns of contamination on fingers and clothes and also prevents foreign objects such as dust from mingling into ink.

There is no specific limit to the container. Any form, any structure, any size, and any material can be suitably selected to a particular application. For example, a container having an ink bag formed of aluminum laminate film, a resin film, etc. is suitable.

Next, the ink cartridge is described in detail with reference to FIGS. 1 and 2.

FIG. 1 is a schematic diagram illustrating an example of an ink bag 241 of the ink cartridge of the present disclosure. FIG. 2 is a schematic diagram illustrating an ink cartridge 200 that accommodates the ink bag 241 of FIG. 1 in a cartridge housing 244.

As illustrated in FIG. 1, after the ink bag 241 is filled with ink through an ink inlet 242 and the air remaining in the ink bag 241 is discharged, the ink inlet 242 is closed by fusion. When in use, the ink is supplied by piercing the needle attached to the inkjet recording device into an ink outlet 243 made of rubber. The ink bag 241 is formed of a packaging material such as aluminum laminate film having no air permeability.

Figure 2:
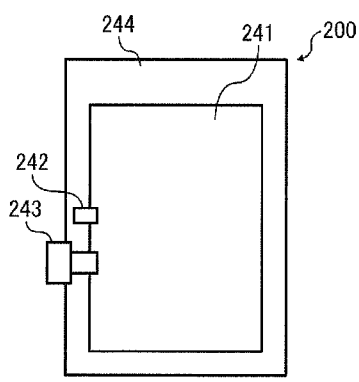
FIG. 2 is a schematic diagram illustrating an example of the ink cartridge according to an embodiment of the present disclosure in which the ink bag of FIG. 1 is accommodated.

The ink bag 241 is accommodated in a cartridge case 244 made of plastic as illustrated in FIG. 2 and detachably attachable to an inkjet recording device as the ink cartridge 200.

It is preferable that the ink cartridge (container that accommodates the active energy ray curing type composition of the present disclosure) is detachably attachable to an inkjet recording device.

By using the ink cartridge, replenishing and exchanging ink is simplified, thereby improving the workability.

As for a coating base (substrate), paper, plastic, metal, ceramic, glass, or a composite material thereof is used.

Since an absorbent base, such as wood free paper, can expect an effect of penetrating and drying, it is practical to use an aqueous ink or an oil ink, which is not a quick-drying ink, for such a base.

On the other hand, it is practical to use a quick-drying ink for a non-absorbent base, such as gloss coat paper, a plastic film, a plastic molded article, ceramic, glass, and metal.

The active energy ray curing type composition of the present disclosure is preferably used on, but is not limited to, non-absorbent recording media which are immediately cured upon application of light. Of such non-absorbent recording media, the active energy ray curing type composition of the present disclosure is suitably used for plastic films or plastic molded articles formed of polyethylene, polypropylene, polyethylene terephthalate, polycarbonate, an ABS resin, polyvinyl chloride, polystyrene, any other polyesters, polyamide, a vinyl-based material, or a composite material thereof.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present invention is described in detail with reference to Examples and Comparative Examples but not limited thereto.

Evaluation Method of SI Value

According to the skin sensitization test based on the LLNA (Local Lymph Node Assay), the SI value was measured in the manner described below.

Test Material

Positive Control Substance $\alpha$-hexylcinnamaldehyde (HCA; product of Wako Pure Chemical Industries, Ltd.) was used as positive control material.

Medium

As a medium, a mixture containing acetone (product of Wako Pure Chemical Industries, Ltd.) and olive oil (product of Fudimi Pharmaceutical Co., Ltd.) in a volume ratio of 4 to 1 was used.

Animals Used

Before treated with the test substances, the positive control or the medium control, female mice were acclimated for 8 days including 6-day quarantine. No abnormalities were found in all the mice (used animals) during the quarantine/acclimation period.

Based on the body weights measured 2 days before the initiation of sensitization, they were categorized into 2 groups (4 mice/group) by the body weight stratified random sampling method so that the body weight of each individual was within ±20% of the average body weight of all the individuals. Each of the used animals was 8 weeks old to 9 weeks old at the time of the initiation of sensitization. The individuals remaining after the categorization were excluded from the test.

The used animals were individually identified by application of oil ink to their tale throughout the test period, and also their cages were labeled for identification.

Housing Environment

Throughout the housing period including the quarantine/acclimation period, the used animals were housed in an animal room with barrier system, which was set as follows: 21° C. to 25° C. in temperature, 40% to 70% in relative humidity, 10 times/hour to 15 times/hour in frequency of air circulation, and a 12 hour-interval lighting cycle (lighting from 7:00 to 19:00).

The housing cages used were those made of polycarbonate, and four animals were housed in each cage. The used animals were given ad libitum solid feed for laboratory animals MF (product of Oriental Yeast Co., Ltd.).

The used animals were given ad libitum solid feed for laboratory animals MF (product of Oriental Yeast Co., Ltd.). Also, using a water-supply bottle, the used animals were given ad libitum tap water in which sodium hypochlorite (PURELOX, product of OYALOX Co., Ltd.) had been added so that the chlorine concentration was about 5 ppm. Bedding used was SUNFLAKE (fir tree, shavings obtained with a power planer) (product of Charles River Inc.). The feed and all of the feeding equipment were sterilized with an autoclave (121° C., 30 min) before use.

The housing cage and the bedding were replaced with new ones at the times of the categorization and the removal of the auricular lymph node (i.e., the time when the animals were transferred from the animal room), and the water-supply bottle and rack were replaced with new ones at the time of the categorization.

Test Method

Group Composition

The group compositions of the medium control group and positive control group used for the measurement of the SI value are shown in Table 1.

TABLE 1

| Test group | Skin sensitizing material | Amount of skin sensitization (μL/auricular lymph) | Number of skin sensitizing | Number of animals (Animal number) |
|---|---|---|---|---|
| Vehicle control group | Medium only | 25 | Once/day × 3 days | 4 (1 to 4) |
| Positive control group | 25.0% HCA | 25 | Once/day × 3 days | 4 (5 to 8) |

Preparation

Test Substance

Table 2 shows the amount of the test substance. The test substance was weighed in a measuring flask, and the volume of the test substance was adjusted to 1 mL with the medium. The thus-prepared test substance preparation was placed in a light-shielded airtight container (made of glass).

TABLE 2

| | Adjustment concentration (W/v %) | Test substance weight (g) |
|---|---|---|
| Test substance | 50.0 (W/v %) | 0.5 |

Positive Control Substance

About 0.25 g of HCA was accurately weighed, and the medium was added to the HCA to have the volume of 1 mL, to thereby prepare a 25.0% by mass solution. The thus-prepared positive control substance preparation was placed in a light-shielded airtight container (made of glass).

BrdU 200 mg of 5-bromo-2'-deoxyuridine (BrdU, product of NACALAI TESQUE, INC.) was accurately weighed in a measuring flask. Thereafter, physiological saline (product of OTSUKA PHARMACEUTICAL CO., LTD.) was added into the measuring flask, and dissolved through application of ultrasonic waves. Thereafter, the volume of the resultant solution was adjusted to 20 mL to prepare a 10 mg/mL solution (BrdU preparation). The BrdU preparation was sterilized through filtration with a sterilized filtration filter and placed in a sterilized container.

Preparation Day and Storage Period

The positive control preparation was prepared on the day before the initiation of sensitization, and stored in a cold place except in use. The medium and the test substance preparations were prepared on the day of sensitization. The BrdU preparation was prepared 2 days before administration and stored in a cold place until the day of administration.

Sensitization and Administration of BrdU

Sensitization

Each (25 μL) of the test substance preparations, the positive control preparation or the medium was applied to both the auricles of each of the used animals using a micropipetter. This treatment was performed once a day for three consecutive days.

Administration of BrdU

About 48 hours after the final sensitization, the BrdU preparation (0.5 mL) was intraperitoneally administered once to each of the used animals.

Observation and Examination

General Conditions

All the used animals used for the test were observed once or more times a day from the day of the initiation of sensitization to the day of the removal of the auricular lymph node (i.e., the day when the animals were transferred from the animal room). Notably, the observation day was counted from the day of the initiation of sensitization being regarded as Day 1.

Measurement of Body Weights

The body weight of each of the used animals was measured on the day of the initiation of sensitization and on the day of the removal of the auricular lymph node (i.e., the day when the animals were transferred from the animal room). Also, the average of the body weights and the standard error thereof were calculated for each group.

Removal of Auricular Lymph Node and Measurement of Weight Thereof

About 24 hours after the administration of BrdU, the used animals were allowed to undergo euthanasia, and their auricular lymph nodes were sampled. The surrounding tissue of each auricular lymph node was removed, and the auricular lymph nodes from both the auricles were collectively weighed. Also, the average of the weights of the auricular lymph nodes and the standard error thereof were calculated for each group. After the measurement of the weights, the auricular lymph nodes of each individual were stored in a frozen state using a BIO MEDICAL FREEZER set to −20° C.

Measurement of BrdU Intake

After returning the auricular lymph nodes to room temperature, the auricular lymph nodes were mashed with the gradual addition of physiological saline, and suspended therein. The thus-obtained suspension was filtrated and thereafter dispensed into the wells of a 96-well microplate, with 3 wells being used per individual. The thus-dispensed suspensions were measured for intake of BrdU by the ELISA method. The reagents used were those of a commercially available kit (Cell Proliferation ELISA, BrdU colorimetric, Cat. No. 1647229, product of Roche Diagnostics Inc.). A multiplate reader (FLUOSTAR OPTIMA, product of BMG LABTECH Inc.) was used to measure the absorbance of each well (OD: 370 nm to 492 nm, the intake of BrdU), and the average of the absorbance of the 3 wells for each individual was used as the measurement of BrdU for the individual.

Evaluation of Results

Calculation of Stimulation Index (SI)

As shown in the following formula, the measurement of BrdU intake for each individual was divided by the average of the measurements of BrdU intake in the vehicle control group to calculate the SI value for the individual. The SI value of each test group was the average of the SI values of the individuals. Notably, the SI value was rounded at the second decimal place and shown to the first decimal place.

SI=Average (average of 3 well) of BrdU measuring values of individuals/Average (average of 4 well) of BrdU measuring values of 4 animals) of BrdU measuring values of vehicle control group    Relation 1

Example 1

Preparation and Evaluation Test of Inks of Example 1-1 to Example 1-5

The following materials (a), (b), and (c) were mixed at ratios (in parts by weight) shown in Example 1 of Table 3 to prepare ink.

(a): (Meth)acrylic acid ester negative in skin sensitization potential as a result of the evaluation test described above
(b): Photoradical Polymerization Initiator
(c): Polyether-modified polysiloxane material Details of a1 to a6, b1, and c-1 to c-5 of Table 3 to Table 15 are as follows. Values in parentheses at the ends are SI values in (1) LLNA test, and "None" means "negative for skin sensitization" or "no skin sensitization" in (2) MSDS (Material Safety Data Sheet).

(a): (Meth)acrylic acid ester negative in skin sensitization potential a1: diethyleneglycol dimethacrylate (n=2) represented by the chemical formula 2, "2G" from Shin-Nakamura Chemical Co., Ltd., (1.1)

$$CH_2=C(CH_3)-CO-O(CH_2-CH_2O)-CH_2-CH_2O)OC-C(CH_3)=CH_2$$    Chemical formula 2 a2: caprolactone-modified dipentaerythritol hexaacrylate represented by the chemical formula 3, "DPCA 60" from Nippon Kayaku Co., Ltd. (Negative in MSDS)

Chemical formula 3

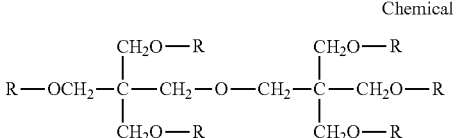

In the chemical formula 3, R each, independently, represents a hydrogen or

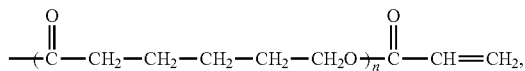

where n is an integer of 1 or greater.

In the case of DPCA60, each R is

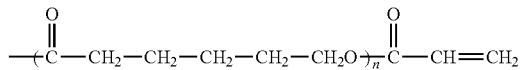

where n is 1.

a3: ethyleneoxide-modified trimethylolpropanetrimethacrylate (n=3) represented by the chemical formula 4, "TMPT-3EO" from Shin-Nakamura Chemical Co., Ltd., (1.0)

Chemical formula 4

$$CH_3-CH_2-C(-CH_2O-CH_2-CH_2O-\overset{O}{\underset{\|}{C}}-\overset{CH_3}{\underset{|}{C}}=CH_2)_3$$

a4: ethylene oxide-modified bisphenol A diacrylate (n=10), represented by the chemical formula 5, "BPE10", product of DAI-ICHI KOGYO SEIYAKU CO., LTD., (1.2)

Chemical formula 5

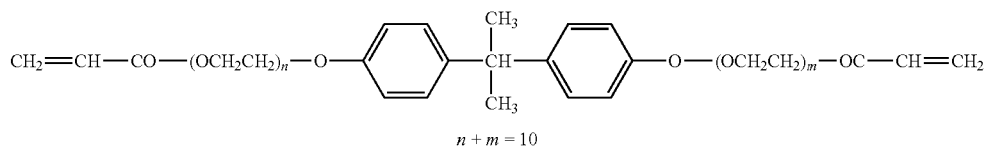

a5: polypropylene glycol diacrylate (n=12), represented by the chemical formula 6, "M-270", represented by the chemical formula 6, manufactured by Toagosei Company, Limited, (1.5)

Chemical formula 6

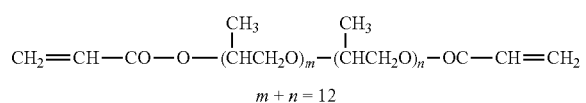

a6: ethyleneoxide-modified pentaerythritol tetraacrylate (n=35) represented by the chemical formula 7, "ATM-35E" from Shin-Nakamura Chemical Co., Ltd., (1.6)

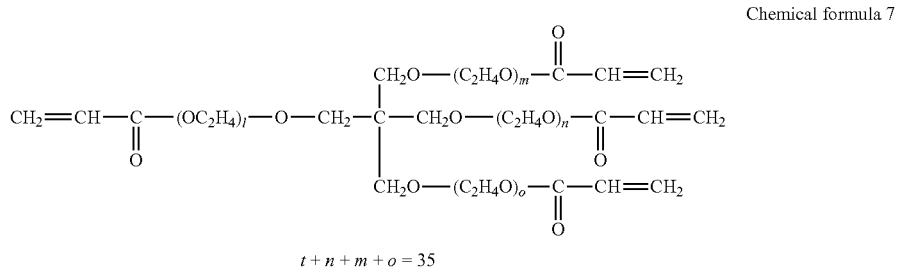

Chemical formula 7

$t + n + m + o = 35$ (b) Photoradical Polymerization Initiator
b1: 1-hydroxycyclohexylphenylketone "Irgacure 184" from BASF (Negative in MSDS)
(c) Polysiloxane Material
c1: polyether-modified polysiloxane represented as $(CH_3)_3Si-O-[Si(CH_3)_2-O)]a-[Si(CH_3)(X)-O]b-Si(CH_3)_3$, (KF353, manufactured by Shin-Etsu Chemical Co., Ltd.)
c2: polyether-modified polysiloxane represented as $(CH_3)_3Si-O-[Si(CH_3)_2-O)]a-[Si(CH_3)(X)-O]-Si(CH_3)_3$, (KF351A, manufactured by Shin-Etsu Chemical Co., Ltd.)
c3: polyether-modified polysiloxane represented as $(CH_3)_3Si-O-[Si(CH_3)_2-O)]a-[Si(CH_3)(X)-O]b-Si(CH_3)_3$, (KF352A, manufactured by Shin-Etsu Chemical Co., Ltd.)
c4: polyether-modified polysiloxane represented as $(CH_3)_3Si-O-[Si(CH_3)_2-O)]a-[Si(CH_3)(X)-O]b-Si(CH_3)_3$, (BYK-UV-3510, manufactured by Byk Chemie Japan Co.)
c5: polyether-modified polysiloxane represented as $(CH_3)_3Si-O-[Si(CH_3)_2-O)]a-[Si(CH_3)(X)-O]b-Si(CH_3)_3$, (BYK-377, manufactured by Byk Chemie Japan Co.)
where X represents $R(C_2H_4O)c(C_3H_6O)d-R'$, where R represents a single bond or an alkylene group, R' represents a hydrogen atom or an alkyl group, a to d each, represent average polymerization degree including a case of c or d being 0.
c6: polysiloxane represented as $(CH_3)_3Si-O-[Si(CH_3)_2-O)]a-[Si(CH_3)_3]_3$ (KF-96H-12500cs, manufactured by Shin-Etsu Chemical Co., Ltd.)
c7: polysiloxane represented as $(CH_3)_3Si-O-[Si(CH_3)_2-O)]a-[Si(CH_3)_3]_2(-ROH)$, (X-22-170BX, manufactured by Shin-Etsu Chemical Co., Ltd.)

The viscosity at 25° C., 45° C., and 60° C. and the scratch resistance of a formed layer of each ink were measured.

The viscosity was measured by a cone plate-type rotary viscometer (manufactured by TOKI SANGYO CO., LTD.) with the temperature of circulating water being constantly set to 25° C., 45° C. and 60° C. The temperature of 25° C. was set assuming typical room temperature. The temperatures of 45° C. and 60° C. were set taking into account the specification of a heatable marketed inkjet ejection head such as GEN4 from Ricoh Printing Systems, Ltd.

The photopolymerizable inkjet ink was prepared according to a predetermined recipe. For evaluation, the inkjet ink was filtered through a membrane filter made of fluorine resin, having a pore diameter of 5 microns. The filtrated ink was placed in a sealed aluminum pouch bag having the shape illustrated to shut out air bubbles. Thereafter, the pouch bag was accommodated in a plastic cartridge as shown in FIG. 2. In a chassis capable of accommodating the cartridge, an ink flow channel was formed from the cartridge to the GEN4 head from Ricoh Printing Systems, Ltd. to form a solid coated film having a thickness about 40 microns by ejecting the ink.

The solid coated film, which was formed on a marketed polyethyleneterephthalate film (corona-treated E5100 having a thickness of 100 microns from Toyobo Co., Ltd.), was thereafter cured under the conditions of: wavelength corresponding to UVA range; irradiation of 0.3 W/cm$_2$ and light amount of 1.2 J/cm$_2$ to evaluate the robustness and the workability of the cured layer.

Scratch resistance according to a pencil method specified in JIS-K-5600-5-4 was used to evaluate the robustness of irradiated and cured solid layer. Pencil hardness includes 2H, H, F, HB, B, 2B to 6B in descending order of hardness.

In addition, a portion where no ink intentionally landed was formed in a line manner by setting two adjacent nozzles that ejected no ink when forming a solid layer by an inkjet head to evaluate the wet spreading property of the ink. Thereafter, whether the ink wet-spread to fill the portion was checked.

A solid layer without ink omission was formed in about one minute of leveling time if the ink wet-spread. It was evaluated as "good". An ink omission portion was formed in a line manner with a width of from 10 micro meter to 40 micro meter if the ink did not wet-spread sufficiently. It was evaluated as "bad". A line omission of less than 10 micro meter was evaluated as "fair"

Comparative Example 1

Preparation and Evaluation Test of Inks of Comparative Example 1 to Comparative Example 1-3

The materials (a) to (c) shown in Table 3 were mixed at ratios (parts by weight) shown in Comparative Example 1 of Table 3 to prepare inks. The thus-obtained inks were evaluated in the same manner as in Example 1. The results are shown in Table 3.

TABLE 3

| Material | | Comp. Ex. 1 | Ex. 1-1 | Ex. 1-2 | Ex. 1-3 | Ex. 1-4 | Ex. 1-5 | Comp. Ex. 1-2 | Comp. Ex. 1-3 |
|---|---|---|---|---|---|---|---|---|---|
| a (meth)acrylic acid ester | a1 | 85 | 85 | 85 | 85 | 85 | 85 | 85 | 85 |
| | a2 | 5 | 5 | 5 | 5 | 5 | 5 | 5 | 5 |

TABLE 3-continued

| Material | | Comp. Ex. 1 | Ex. 1-1 | Ex. 1-2 | Ex. 1-3 | Ex. 1-4 | Ex. 1-5 | Comp. Ex. 1-2 | Comp. Ex. 1-3 |
|---|---|---|---|---|---|---|---|---|---|
| | a3 | | | | | | | | |
| | a4 | | | | | | | | |
| | a5 | | | | | | | | |
| | a6 | | | | | | | | |
| b polymerization initiator | b1 | 20 | 20 | 20 | 20 | 20 | 20 | 20 | 20 |
| c Polyether- | c1 | | 1 | | | | | | |
| polysiloxane (modified) | c2 | | | 1 | | | | | |
| material polysiloxane | c3 | | | | 1 | | | | |
| | c4 | | | | | 1 | | | |
| | c5 | | | | | | 1 | | |
| | c6 | | | | | | | 1 | |
| | c7 | | | | | | | | 1 |
| Viscosity at 25° C. (mPa · sec) | | 12 | 12 | 12 | 12 | 12 | 12 | 12 | 12 |
| Viscosity at 45° C. (mPa · sec) | | *1 | *1 | *1 | *1 | *1 | *1 | *1 | *1 |
| Viscosity at 60° C. (mPa · sec) | | *1 | *1 | *1 | *1 | *1 | *1 | *1 | *1 |
| Coating condition | Temp. at discharging head | 25° C. | 25° C. | 25° C. | 25° C. | 25° C. | 25° C. | 25° C. | 25° C. |
| Coating property | Pencil hardness of formed layer | HB | HB | HB | HB | HB | HB | HB | HB |
| | Omission | Bad | Good | Good | Good | Good | Good | Bad | Bad |

*1: Viscosity was not measured because inkjet discharging was possible at temperatures lower than the set temperature.

Example 2

Preparation and Evaluation Test of Inks of Example 2-1 to Example 2-5

The materials (a) to (c) shown in Table 4 were mixed at ratios (parts by weight) shown in each corresponding cell of Table 4 to prepare ink. The thus-obtained ink was evaluated in the same manner as in Example 1. The results are shown in Table 4.

Comparative Example 2

Preparation and Evaluation Test of Inks of Comparative Example 2 to Comparative Example 2-3

The materials (a) to (c) shown in Table 4 were mixed at ratios (parts by weight) shown in each corresponding cell of Table 4 to prepare ink. The thus-obtained ink was evaluated in the same manner as in Example 1. The results are shown in Table 4.

TABLE 4

| Material | | Comp. Ex. 2 | Ex. 2-1 | Ex. 2-2 | Ex. 2-3 | Ex. 2-4 | Ex. 2-5 | Comp. Ex. 2-2 | Comp. Ex. 2-3 |
|---|---|---|---|---|---|---|---|---|---|
| a (meth)acrylic acid ester | a1 | 80 | 80 | 80 | 80 | 80 | 80 | 80 | 80 |
| | a2 | 5 | 5 | 5 | 5 | 5 | 5 | 5 | 5 |
| | a3 | | | | | | | | |
| | a4 | | | | | | | | |
| | a5 | | | | | | | | |
| | a6 | | | | | | | | |
| b polymerization initiator | b1 | 20 | 20 | 20 | 20 | 20 | 20 | 20 | 20 |
| c Polyether- | c1 | | 1 | | | | | | |
| polysiloxane (modified) | c2 | | | 1 | | | | | |
| material polysiloxane | c3 | | | | 1 | | | | |
| | c4 | | | | | 1 | | | |
| | c5 | | | | | | 1 | | |
| | c6 | | | | | | | 1 | |
| | c7 | | | | | | | | 1 |
| Viscosity at 25° C. (mPa · sec) | | 12 | 12 | 12 | 12 | 12 | 12 | 12 | 12 |
| Viscosity at 45° C. (mPa · sec) | | *1 | *1 | *1 | *1 | *1 | *1 | *1 | *1 |
| Viscosity at 60° C. (mPa · sec) | | *1 | *1 | *1 | *1 | *1 | *1 | *1 | *1 |
| Coating condition | Temp. at discharging head | 25° C. | 25° C. | 25° C. | 25° C. | 25° C. | 25° C. | 25° C. | 25° C. |
| Coating property | Pencil hardness of formed layer | HB | HB | HB | HB | HB | HB | HB | HB |
| | Omission | Bad | Good | Good | Good | Good | Good | Bad | Bad |

*1: Viscosity was not measured because inkjet discharging was possible at temperatures lower than the set temperature.

Example 3

Preparation and Evaluation Test of Inks of Example 3-1 to Example 3-5

The materials (a) to (c) shown in Table 5 were mixed at ratios (parts by weight) shown in each corresponding cell of Table 5 to prepare ink. The thus-obtained ink was evaluated in the same manner as in Example 1. The results are shown in Table 5.

Comparative Example 3

Preparation and Evaluation Test of Inks of Comparative Example 3 to Comparative Example 3-3

The materials (a) to (c) shown in Table 5 were mixed at ratios (parts by weight) shown in each corresponding cell of Table 5 to prepare ink. The thus-obtained ink was evaluated in the same manner as in Example 1. The results are shown in Table 5.

TABLE 5

| Material | | Comp. Ex. 3 | Ex. 3-1 | Ex. 3-2 | Ex. 3-3 | Ex. 3-4 | Ex. 3-5 | Comp. Ex. 3-2 | Comp. Ex. 3-3 |
|---|---|---|---|---|---|---|---|---|---|
| a (meth)acrylic acid ester | a1 | 65 | 65 | 65 | 65 | 65 | 65 | 65 | 65 |
| | a2 | 5 | 5 | 5 | 5 | 5 | 5 | 5 | 5 |
| | a3 | | | | | | | | |
| | a4 | | | | | | | | |
| | a5 | | | | | | | | |
| | a6 | 30 | 30 | 30 | 30 | 30 | 30 | 30 | 30 |
| b polymerization initiator | b1 | 20 | 20 | 20 | 20 | 20 | 20 | 20 | 20 |
| c Polyether-polysiloxane (modified) material polysiloxane | c1 | | 1 | | | | | | |
| | c2 | | | 1 | | | | | |
| | c3 | | | | 1 | | | | |
| | c4 | | | | | 1 | | | |
| | c5 | | | | | | 1 | | |
| | c6 | | | | | | | 1 | |
| | c7 | | | | | | | | 1 |
| Viscosity at 25° C. (mPa · sec) | | 35 | 35 | 35 | 35 | 35 | 35 | 35 | 35 |
| Viscosity at 45° C. (mPa · sec) | | 14 | 14 | 14 | 14 | 14 | 14 | 14 | 14 |
| Viscosity at 60° C. (mPa · sec) | | *1 | *1 | *1 | *1 | *1 | *1 | *1 | *1 |
| Coating condition | Temp. at discharging head | 45° C. | 45° C. | 45° C. | 45° C. | 45° C. | 45° C. | 45° C. | 45° C. |
| Coating property | Pencil hardness of formed layer | F | F | F | F | F | F | F | F |
| | Omission | Bad | Good | Good | Good | Good | Good | Bad | Bad |

*1: Viscosity was not measured because inkjet discharging was possible at temperatures lower than the set temperature.

Example 4

Preparation and Evaluation Test of Inks of Example 4-1 to Example 4-5

The materials (a) to (c) shown in Table 6 were mixed at ratios (parts by weight) shown in each corresponding cell of Table 6 to prepare ink. The thus-obtained ink was evaluated in the same manner as in Example 1. The results are shown in Table 6.

Comparative Example 4

Preparation and Evaluation Test of Inks of Comparative Example 4 to Comparative Example 4-3

The materials (a) to (c) shown in Table 6 were mixed at ratios (parts by weight) shown in each corresponding cell of Table 6 to prepare ink. The thus-obtained ink was evaluated in the same manner as in Example 1. The results are shown in Table 6.

TABLE 6

| Material | | Comp. Ex. 4 | Ex. 4-1 | Ex. 4-2 | Ex. 4-3 | Ex. 4-4 | Ex. 4-5 | Comp. Ex. 4-2 | Comp. Ex. 4-3 |
|---|---|---|---|---|---|---|---|---|---|
| a (meth)acrylic acid ester | a1 | 45 | 45 | 45 | 45 | 45 | 45 | 45 | 45 |
| | a2 | 5 | 5 | 5 | 5 | 5 | 5 | 5 | 5 |
| | a3 | | | | | | | | |
| | a4 | | | | | | | | |
| | a5 | 50 | 50 | 50 | 50 | 50 | 50 | 50 | 50 |
| | a6 | | | | | | | | |
| b polymerization initiator | b1 | 20 | 20 | 20 | 20 | 20 | 20 | 20 | 20 |
| c Polyether- polysiloxane (modified) material polysiloxane | c1 | | 1 | | | | | | |
| | c2 | | | 1 | | | | | |
| | c3 | | | | 1 | | | | |
| | c4 | | | | | 1 | | | |
| | c5 | | | | | | 1 | | |
| | c6 | | | | | | | 1 | |
| | c7 | | | | | | | | 1 |
| Viscosity at 25° C. (mPa · sec) | | 30 | 30 | 30 | 30 | 30 | 30 | 30 | 30 |
| Viscosity at 45° C. (mPa · sec) | | 11 | 11 | 11 | 11 | 11 | 11 | 11 | 11 |
| Viscosity at 60° C. (mPa · sec) | | *1 | *1 | *1 | *1 | *1 | *1 | *1 | *1 |
| Coating condition | Temp. at discharging head | 45° C. | 45° C. | 45° C. | 45° C. | 45° C. | 45° C. | 45° C. | 45° C. |
| Coating property | Pencil hardness of formed layer | F | F | F | F | F | F | F | F |
| | Omission | Bad | Good | Good | Good | Good | Good | Bad | Bad |

*1: Viscosity was not measured because inkjet discharging was possible at temperatures lower than the set temperature.

Example 5

Preparation and Evaluation Test of Inks of Example 5-1 to Example 5-5

The materials (a) to (c) shown in Table 7 were mixed at ratios (parts by weight) shown in each corresponding cell of Table 7 to prepare ink. The thus-obtained ink was evaluated in the same manner as in Example 1. The results are shown in Table 7.

Comparative Example 5

Preparation and Evaluation Test of Inks of Comparative 5 Example 5 to Comparative Example 5-3

The materials (a) to (c) shown in Table 7 were mixed at ratios (parts by weight) shown in each corresponding cell of Table 7 to prepare ink. The thus-obtained ink was evaluated in the same manner as in Example 1. The results are shown in Table 7.

TABLE 7

| Material | | Comp. Ex. 5 | Ex. 5-1 | Ex. 5-2 | Ex. 5-3 | Ex. 5-4 | Ex. 5-5 | Comp. Ex. 5-2 | Comp. Ex. 5-3 |
|---|---|---|---|---|---|---|---|---|---|
| a (meth)acrylic acid ester | a1 | 25 | 25 | 25 | 25 | 25 | 25 | 25 | 25 |
| | a2 | 5 | 5 | 5 | 5 | 5 | 5 | 5 | 5 |
| | a3 | | | | | | | | |
| | a4 | | | | | | | | |
| | a5 | 70 | 70 | 70 | 70 | 70 | 70 | 70 | 70 |
| | a6 | | | | | | | | |
| b polymerization initiator | b1 | 20 | 20 | 20 | 20 | 20 | 20 | 20 | 20 |
| c Polyether- polysiloxane (modified) material polysiloxane | c1 | | 1 | | | | | | |
| | c2 | | | 1 | | | | | |
| | c3 | | | | 1 | | | | |
| | c4 | | | | | 1 | | | |
| | c5 | | | | | | 1 | | |
| | c6 | | | | | | | 1 | |
| | c7 | | | | | | | | 1 |
| Viscosity at 25° C. (mPa · sec) | | 35 | 35 | 35 | 35 | 35 | 35 | 35 | 35 |
| Viscosity at 45° C. (mPa · sec) | | 16 | 16 | 16 | 16 | 16 | 16 | 16 | 16 |
| Viscosity at 60° C. (mPa · sec) | | 9 | 9 | 9 | 9 | 9 | 9 | 9 | 9 |
| Coating condition | Temp. at discharging head | 60° C. | 60° C. | 60° C. | 60° C. | 60° C. | 60° C. | 60° C. | 60° C. |
| Coating property | Pencil hardness of formed layer | HB | HB | HB | HB | HB | HB | HB | HB |
| | Omission | Bad | Good | Good | Good | Good | Good | Bad | Bad |

Example 6

Preparation and Evaluation Test of Inks of Example 6-1 to Example 6-5

The materials (a) to (c) shown in Table 8 were mixed at ratios (parts by weight) shown in each corresponding cell of Table 8 to prepare ink. The thus-obtained ink was evaluated in the same manner as in Example 1. The results are shown in Table 8.

Comparative Example 6

Preparation and Evaluation Test of Inks of Comparative Example 6 to Comparative Example 6-3

The materials (a) to (c) shown in Table 8 were mixed at ratios (parts by weight) shown in each corresponding cell of Table 8 to prepare ink. The thus-obtained ink was evaluated in the same manner as in Example 1. The results are shown in Table 8.

TABLE 8

| Material | | Comp. Ex. 6 | Ex. 6-1 | Ex. 6-2 | Ex. 6-3 | Ex. 6-4 | Ex. 6-5 | Comp. Ex. 6-2 | Comp., Ex. 6-3 |
|---|---|---|---|---|---|---|---|---|---|
| a (meth)acrylic acid ester | a1 | 50 | 50 | 50 | 50 | 50 | 50 | 50 | 50 |
| | a2 | 5 | 5 | 5 | 5 | 5 | 5 | 5 | 5 |
| | a3 | | | | | | | | |
| | a4 | 45 | 45 | 45 | 45 | 45 | 45 | 45 | 45 |
| | a5 | | | | | | | | |
| | a6 | | | | | | | | |
| b polymerization initiator | b1 | 20 | 20 | 20 | 20 | 20 | 20 | 20 | 20 |
| c Polyether-polysiloxane (modified) material polysiloxane | c1 | | 1 | | | | | | |
| | c2 | | | 1 | | | | | |
| | c3 | | | | 1 | | | | |
| | c4 | | | | | 1 | | | |
| | c5 | | | | | | 1 | | |
| | c6 | | | | | | | 1 | |
| | c7 | | | | | | | | 1 |
| Viscosity at 25° C. (mPa · sec) | | 40 | 40 | 40 | 40 | 40 | 40 | 40 | 40 |
| Viscosity at 45° C. (mPa · sec) | | 19 | 19 | 19 | 19 | 19 | 19 | 19 | 19 |
| Viscosity at 60° C. (mPa · sec) | | 10 | 10 | 10 | 10 | 10 | 10 | 10 | 10 |
| Coating condition | Temp. at discharging head | 60° C. | 60° C. | 60° C. | 60° C. | 60° C. | 60° C. | 60° C. | 60° C. |
| Coating property | Pencil hardness of formed layer | F | F | F | F | F | F | F | F |
| | Omission | Bad | Good | Good | Good | Good | Good | Bad | Bad |

Example 7

Preparation and Evaluation Test of Inks of Example 7-1 to Example 7-5

The materials (a) to (c) shown in Table 9 were mixed at ratios (parts by weight) shown in each corresponding cell of Table 9 to prepare ink. The thus-obtained ink was evaluated in the same manner as in Example 1. The results are shown in Table 9.

Comparative Example 7

Preparation and Evaluation Test of Inks of Comparative Example 7 to Comparative Example 7-3

The materials (a) to (c) shown in Table 9 were mixed at ratios (parts by weight) shown in each corresponding cell of Table 9 to prepare ink. The thus-obtained ink was evaluated in the same manner as in Example 1. The results are shown in Table 9.

TABLE 9

| Material | | Comp. Ex. 7 | Ex. 7-1 | Ex. 7-2 | Ex. 7-3 | Ex. 7-4 | Ex. 7-5 | Comp. Ex. 7-2 | Comp. Ex. 7-3 |
|---|---|---|---|---|---|---|---|---|---|
| a (meth)acrylic acid ester | a1 | 45 | 45 | 45 | 45 | 45 | 45 | 45 | 45 |
| | a2 | | | | | | | | |

TABLE 9-continued

| Material | | | Comp. Ex. 7 | Ex. 7-1 | Ex. 7-2 | Ex. 7-3 | Ex. 7-4 | Ex. 7-5 | Comp. Ex. 7-2 | Comp. Ex. 7-3 |
|---|---|---|---|---|---|---|---|---|---|---|
| | | a3 | 50 | 50 | 50 | 50 | 50 | 50 | 50 | 50 |
| | | a4 | | | | | | | | |
| | | a5 | | | | | | | | |
| | | a6 | | | | | | | | |
| b polymerization initiator | | b1 | 20 | 20 | 20 | 20 | 20 | 20 | 20 | 20 |
| c polysiloxane material | Polyether-(modified) polysiloxane | c1 | | 1 | | | | | | |
| | | c2 | | | 1 | | | | | |
| | | c3 | | | | 1 | | | | |
| | | c4 | | | | | 1 | | | |
| | | c5 | | | | | | 1 | | |
| | | c6 | | | | | | | 1 | |
| | | c7 | | | | | | | | 1 |
| Viscosity at 25° C. (mPa · sec) | | | 20 | 20 | 20 | 20 | 20 | 20 | 20 | 20 |
| Viscosity at 45° C. (mPa · sec) | | | 10 | 10 | 10 | 10 | 10 | 10 | 10 | 10 |
| Viscosity at 60° C. (mPa · sec) | | | *1 | *1 | *1 | *1 | *1 | *1 | *1 | *1 |
| Coating condition | Temp. at discharging head | | 45° C. | 45° C. | 45° C. | 45° C. | 45° C. | 45° C. | 45° C. | 45° C. |
| Coating property | Pencil hardness of formed layer | | F | F | F | F | F | F | F | F |
| | Omission | | Bad | Good | Good | Good | Good | Good | Bad | Bad |

*1: Viscosity was not measured because inkjet discharging was possible at temperatures lower than the set temperature.

Example 8

Preparation and Evaluation Test of Inks of Example 8-1 to Example 8-5

The materials (a) to (c) shown in Table 10 were mixed at ratios (parts by weight) shown in each corresponding cell of Table 10 to prepare ink. The thus-obtained ink was evaluated in the same manner as in Example 1.

The results are shown in Table 10.

Comparative Example 8

Preparation and Evaluation Test of Inks of Comparative Example 8 to Comparative Example 8-3

The materials (a) to (c) shown in Table 10 were mixed at ratios (parts by weight) shown in each corresponding cell of Table 10 to prepare ink. The thus-obtained ink was evaluated in the same manner as in Example 1.

The results are shown in Table 10.

TABLE 10

| Material | | | Comp. Ex. 8 | Ex. 8-1 | Ex. 8-2 | Ex. 8-3 | Ex. 8-4 | Ex. 8-5 | Comp. Ex. 8-2 | Comp. Ex. 8-3 |
|---|---|---|---|---|---|---|---|---|---|---|
| a (meth)acrylic acid ester | | a1 | 45 | 45 | 45 | 45 | 45 | 45 | 45 | 45 |
| | | a2 | | | | | | | | |
| | | a3 | 45 | 45 | 45 | 45 | 45 | 45 | 45 | 45 |
| | | a4 | | | | | | | | |
| | | a5 | | | | | | | | |
| | | a6 | | | | | | | | |
| b polymerization initiator | | b1 | 20 | 20 | 20 | 20 | 20 | 20 | 20 | 20 |
| c polysiloxane material | Polyether-(modified) polysiloxane | c1 | | 1 | | | | | | |
| | | c2 | | | 1 | | | | | |
| | | c3 | | | | 1 | | | | |
| | | c4 | | | | | 1 | | | |
| | | c5 | | | | | | 1 | | |
| | | c6 | | | | | | | 1 | |
| | | c7 | | | | | | | | 1 |
| Viscosity at 25° C. (mPa · sec) | | | 18 | 18 | 18 | 18 | 18 | 18 | 18 | 18 |
| Viscosity at 45° C. (mPa · sec) | | | 9 | 9 | 9 | 9 | 9 | 9 | 9 | 9 |
| Viscosity at 60° C. (mPa · sec) | | | *1 | *1 | *1 | *1 | *1 | *1 | *1 | *1 |
| Coating condition | Temp. at discharging head | | 45° C. | 45° C. | 45° C. | 45° C. | 45° C. | 45° C. | 45° C. | 45° C. |
| Coating property | Pencil hardness of formed layer | | F | F | F | F | F | F | F | F |
| | Omission | | Bad | Good | Good | Good | Good | Good | Bad | Bad |

*1: Viscosity was not measured because inkjet discharging was possible at temperatures lower than the set temperature.

Example 9

Preparation and Evaluation Test of Inks of Example 9-1 to Example 9-5

The materials (a) to (c) shown in Table 11 were mixed at ratios (parts by weight) shown in each corresponding cell of Table 11 to prepare ink. The thus-obtained ink was evaluated in the same manner as in Example 1.

The results are shown in Table 11.

Comparative Example 9

Preparation and Evaluation Test of Inks of Comparative Example 9 to Comparative Example 9-3

The materials (a) to (c) shown in Table 11 were mixed at ratios (parts by weight) shown in each corresponding cell of Table 11 to prepare ink. The thus-obtained ink was evaluated in the same manner as in Example 1.

The results are shown in Table 11.

TABLE 11

| Material | | Comp. Ex. 9 | Ex. 9-1 | Ex. 9-2 | Ex. 9-3 | Ex. 9-4 | Ex. 9-5 | Comp. Ex. 9-2 | Comp. Ex. 9-3 |
|---|---|---|---|---|---|---|---|---|---|
| a (meth)acrylic acid ester | a1 | 40 | 40 | 40 | 40 | 40 | 40 | 40 | 40 |
| | a2 | | | | | | | | |
| | a3 | 40 | 40 | 40 | 40 | 40 | 40 | 40 | 40 |
| | a4 | | | | | | | | |
| | a5 | | | | | | | | |
| | a6 | 20 | 20 | 20 | 20 | 20 | 20 | 20 | 20 |
| b polymerization initiator | b1 | 20 | 20 | 20 | 20 | 20 | 20 | 20 | 20 |
| c Polyether-polysiloxane (modified) material polysiloxane | c1 | | 1 | | | | | | |
| | c2 | | | 1 | | | | | |
| | c3 | | | | 1 | | | | |
| | c4 | | | | | 1 | | | |
| | c5 | | | | | | 1 | | |
| | c6 | | | | | | | 1 | |
| | c7 | | | | | | | | 1 |
| Viscosity at 25° C. (mPa·sec) | | 32 | 32 | 32 | 32 | 32 | 32 | 18 | 18 |
| Viscosity at 45° C. (mPa·sec) | | 13 | 13 | 13 | 13 | 13 | 13 | 9 | 9 |
| Viscosity at 60° C. (mPa·sec) | | *1 | *1 | *1 | *1 | *1 | *1 | *1 | *1 |
| Coating condition | Temp. at discharging head | 45° C. | 45° C. | 45° C. | 45° C. | 45° C. | 45° C. | 45° C. | 45° C. |
| Coating property | Pencil hardness of formed layer | H | H | H | H | H | H | F | F |
| | Omission | Bad | Good | Good | Good | Good | Good | Bad | Bad |

*1: Viscosity was not measured because inkjet discharging was possible at temperatures lower than the set temperature.

Example 10

Preparation and Evaluation Test of Inks of Example 10-1 to Example 10-5

The materials (a) to (c) shown in Table 12 were mixed at ratios (parts by weight) shown in each corresponding cell of Table 12 to prepare ink. The thus-obtained ink was evaluated in the same manner as in Example 1.

The results are shown in Table 12.

Comparative Example 10

Preparation and Evaluation Test of Inks of Comparative Example 10 to Comparative Example 10-3

The materials (a) to (c) shown in Table 12 were mixed at ratios (parts by weight) shown in each corresponding cell of Table 12 to prepare ink. The thus-obtained ink was evaluated in the same manner as in Example 1.

The results are shown in Table 12.

TABLE 12

| Material | | Comp. Ex. 10 | Ex. 10-1 | Ex. 10-2 | Ex. 10-3 | Ex. 10-4 | Ex. 10-5 | Comp. Ex. 10-2 | Comp. Ex. 10-3 |
|---|---|---|---|---|---|---|---|---|---|
| a (meth)acrylic acid ester | a1 | 40 | 40 | 40 | 40 | 40 | 40 | 40 | 40 |
| | a2 | | | | | | | | |

TABLE 12-continued

| Material | | Comp. Ex. 10 | Ex. 10-1 | Ex. 10-2 | Ex. 10-3 | Ex. 10-4 | Ex. 10-5 | Comp. Ex. 10-2 | Comp. Ex. 10-3 |
|---|---|---|---|---|---|---|---|---|---|
| | a3 | 40 | 40 | 40 | 40 | 40 | 40 | 40 | 40 |
| | a4 | | | | | | | | |
| | a5 | 20 | 20 | 20 | 20 | 20 | 20 | 20 | 20 |
| | a6 | | | | | | | | |
| b polymerization initiator | b1 | 20 | 20 | 20 | 20 | 20 | 20 | 20 | 20 |
| c Polyether- | c1 | | 1 | | | | | | |
| polysiloxane (modified) | c2 | | | 1 | | | | | |
| material polysiloxane | c3 | | | | 1 | | | | |
| | c4 | | | | | 1 | | | |
| | c5 | | | | | | 1 | | |
| | c6 | | | | | | | 1 | |
| | c7 | | | | | | | | 1 |
| Viscosity at 25° C. (mPa · sec) | | 22 | 22 | 22 | 22 | 22 | 22 | 22 | 22 |
| Viscosity at 45° C. (mPa · sec) | | 11 | 11 | 11 | 11 | 11 | 11 | 11 | 11 |
| Viscosity at 60° C. (mPa · sec) | | *1 | *1 | *1 | *1 | *1 | *1 | *1 | *1 |
| Coating condition | Temp. at discharging head | 45° C. | 45° C. | 45° C. | 45° C. | 45° C. | 45° C. | 45° C. | 45° C. |
| Coating property | Pencil hardness of formed layer | H | H | H | H | H | H | H | H |
| | Omission | Bad | Good | Good | Good | Good | Good | Bad | Bad |

*1: Viscosity was not measured because inkjet discharging was possible at temperatures lower than the set temperature.

Example 11

Preparation and Evaluation Test of Inks of Example 11-1 to Example 11-10

The materials (a) to (c) shown in Table 13 were mixed at ratios (parts by weight) shown in each corresponding cell of Table 13 to prepare ink. The thus-obtained ink was evaluated in the same manner as in Example 1.

Comparative Example 11

Preparation and Evaluation Test of Inks of Comparative Example 11 to Comparative Example 11-4

The materials (a) to (c) shown in Table 13 were mixed at ratios (parts by weight) shown in each corresponding cell of Table 13 to prepare ink. The thus-obtained ink was evaluated in the same manner as in Example 1.

The results are shown in Table 13.

TABLE 13-1

| Material | | Comp. Ex. 11 | Ex. 11-1 | Ex. 11-2 | Ex. 11-3 | Ex. 11-4 | Ex. 11-5 | Comp. Ex. 11-2 | Comp. Ex. 11-3 |
|---|---|---|---|---|---|---|---|---|---|
| a (meth)acrylic acid ester | a1 | 40 | 40 | 40 | 40 | 40 | 40 | 40 | 40 |
| | a2 | | | | | | | | |
| | a3 | 40 | 40 | 40 | 40 | 40 | 40 | 40 | 40 |
| | a4 | 20 | 20 | 20 | 20 | 20 | 20 | 20 | 20 |
| | a5 | | | | | | | | |
| | a6 | | | | | | | | |
| b polymerization initiator | b1 | 20 | 20 | 20 | 20 | 20 | 20 | 20 | 20 |
| c Polyether- | c1 | | 1 | | | | | | |
| polysiloxane (modified) | c2 | | | 1 | | | | | |
| material polysiloxane | c3 | | | | 1 | | | | |
| | c4 | | | | | 1 | | | |
| | c5 | | | | | | 1 | | |
| | c6 | | | | | | | 1 | |
| | c7 | | | | | | | | 1 |
| Viscosity at 25° C. (mPa · sec) | | 33 | 33 | 33 | 33 | 33 | 33 | 33 | 33 |
| Viscosity at 45° C. (mPa · sec) | | 14 | 14 | 14 | 14 | 14 | 14 | 14 | 14 |
| Viscosity at 60° C. (mPa · sec) | | *1 | *1 | *1 | *1 | *1 | *1 | *1 | *1 |
| Coating condition | Temp. at discharging head | 45° C. | 45° C. | 45° C. | 45° C. | 45° C. | 45° C. | 45° C. | 45° C. |
| Coating property | Pencil hardness of formed layer | H | H | H | H | H | H | H | H |
| | Omission | Bad | Good | Good | Good | Good | Good | Bad | Bad |

*1: Viscosity was not measured because inkjet discharging was possible at temperatures lower than the set temperature.

TABLE 13-2

| Material | | Comp. Ex. 11-4 | Ex. 11-6 | Ex. 11-7 | Ex. 11-8 | Ex. 11-9 | Ex. 11-10 | Comp. Ex. 11-11 |
|---|---|---|---|---|---|---|---|---|
| a (meth)acrylic acid ester | a1 | 40 | 40 | 40 | 40 | 40 | 40 | 40 |
| | a2 | | | | | | | |
| | a3 | 40 | 40 | 40 | 40 | 40 | 40 | 40 |
| | a4 | 20 | 20 | 20 | 20 | 20 | 20 | 20 |
| | a5 | | | | | | | |
| | a6 | | | | | | | |
| b polymerization initiator | b1 | 20 | 20 | 20 | 20 | 20 | 20 | 20 |
| c Polyether-polysiloxane (modified) material polysiloxane | c1 | | | | | | | |
| | c2 | | | | | | | |
| | c3 | | | | | | | |
| | c4 | | 0.1 | 0.2 | 0.5 | 1 | 2 | 5 |
| | c5 | | | | | | | |
| | c6 | | | | | | | |
| | c7 | | | | | | | |
| Viscosity at 25° C. (mPa · sec) | | 33 | 33 | 33 | 33 | 33 | 33 | 33 |
| Viscosity at 45° C. (mPa · sec) | | 14 | 14 | 14 | 14 | 14 | 14 | 14 |
| Viscosity at 60° C. (mPa · sec) | | *1 | *1 | *1 | *1 | *1 | *1 | *1 |
| Coating condition | Temp. at discharging head | 45° C. | 45° C. | 45° C. | 45° C. | 45° C. | 45° C. | 45° C. |
| Coating property | Pencil hardness of formed layer | H | H | H | H | H | H | F |
| | Omission | Bad | Fair | Good | Good | Good | Good | Good |

*1: Viscosity was not measured because inkjet discharging was possible at temperatures lower than the set temperature.

Example 12

Preparation and Evaluation Test of Inks of Example 12-1 to Example 12-5

The materials (a) to (c) shown in Table 14 were mixed at ratios (parts by weight) shown in each corresponding cell of Table 14 to prepare ink. The thus-obtained ink was evaluated in the same manner as in Example 1.

The results are shown in Table 14.

Comparative Example 12

Preparation and Evaluation Test of Inks of Comparative Example 12 to Comparative Example 12-3

The materials (a) to (c) shown in Table 14 were mixed at ratios (parts by weight) shown in each corresponding cell of Table 14 to prepare ink. The thus-obtained ink was evaluated in the same manner as in Example 1.

The results are shown in Table 14.

TABLE 14

| Material | | Comp. Ex. 12 | Ex. 12-1 | Ex. 12-2 | Ex. 12-3 | Ex. 12-4 | Ex. 12-5 | Comp. Ex. 12-2 | Comp. Ex. 12-3 |
|---|---|---|---|---|---|---|---|---|---|
| a (meth)acrylic acid ester | a1 | 50 | 50 | 50 | 50 | 50 | 50 | 40 | 40 |
| | a2 | | | | | | | | |
| | a3 | | | | | | | 40 | 40 |
| | a4 | 50 | 50 | 50 | 50 | 50 | 50 | 20 | 20 |
| | a5 | | | | | | | | |
| | a6 | | | | | | | | |
| b polymerization initiator | b1 | 15 | 15 | 15 | 15 | 15 | 15 | 20 | 20 |
| c Polyether-polysiloxane (modified) material polysiloxane | c1 | | 1 | | | | | | |
| | c2 | | | 1 | | | | | |
| | c3 | | | | 1 | | | | |
| | c4 | | | | | 1 | | | |
| | c5 | | | | | | 1 | | |
| | c6 | | | | | | | 1 | |
| | c7 | | | | | | | | 1 |
| Viscosity at 25° C. (mPa · sec) | | 55 | 55 | 55 | 55 | 55 | 55 | 55 | 55 |
| Viscosity at 45° C. (mPa · sec) | | 19 | 19 | 19 | 19 | 19 | 19 | 19 | 19 |
| Viscosity at 60° C. (mPa · sec) | | 12 | 12 | 12 | 12 | 12 | 12 | 12 | 12 |
| Coating condition | Temp. at discharging head | 60° C. | 60° C. | 60° C. | 60° C. | 60° C. | 60° C. | 60° C. | 60° C. |
| Coating property | Pencil hardness of formed layer | F | F | F | F | F | F | F | F |
| | Omission | Bad | Good | Good | Good | Good | Good | Bad | Bad |

Example 13

Preparation and Evaluation Test of Inks of Example 13-1 to Example 13-5

The materials (a) to (c) shown in Table 15 were mixed at ratios (parts by weight) shown in each corresponding cell of Table 15 to prepare ink. The thus-obtained ink was evaluated in the same manner as in Example 1.
The results are shown in Table 15.

Comparative Example 13

Preparation and Evaluation Test of Inks of Comparative Example 13 to Comparative Example 13-3

The materials (a) to (c) shown in Table 15 were mixed at ratios (parts by weight) shown in each corresponding cell of Table 15 to prepare ink. The thus-obtained ink was evaluated in the same manner as in Example 1.
The results are shown in Table 15.

Table 15 to prepare ink. The thus-obtained ink was evaluated in the same manner as in Example 1.

The surface tension of the inks of Examples 14 to 22 and Examples 4-1, 5-4, and 10-1 were measured. The measuring method of surface tension is as follows. The results are shown in Table 16.

Method of Measuring of Surface Tension

Surface tension was measured by automatic surface tension measuring meter (CBVP-Z type from Kyowa Interface Science Co., LTD.) utilizing wilhelmy method. The ink to be measured was placed in a washed petri dish. The dish was statically set on a sample stand and thereafter glow-cleaned platinum plate was hung from the hook of the device for weight detection.

The sample stand was raised and the bottom part of the platinum plate was dipped in the ink in the dish. The surface was calculated from the measured mass value when the weighing became stable.

The room temperature and the liquid temperature upon measuring was 25° C.

TABLE 15

| Material | | Comp. Ex. 13 | Ex. 13-1 | Ex. 13-2 | Ex. 13-3 | Ex. 13-4 | Ex. 13-5 | Comp. Ex. 13-2 | Comp. Ex. 13-3 |
|---|---|---|---|---|---|---|---|---|---|
| a (meth)acrylic acid ester | a1 | 30 | 30 | 30 | 30 | 30 | 30 | 30 | 30 |
| | a2 | | | | | | | | |
| | a3 | | | | | | | | |
| | a4 | | | | | | | | |
| | a5 | 70 | 70 | 70 | 70 | 70 | 70 | 70 | 70 |
| | a6 | | | | | | | | |
| b polymerization initiator | b1 | 15 | 15 | 15 | 15 | 15 | 15 | 20 | 20 |
| c Polyether- | c1 | | 1 | | | | | | |
| polysiloxane (modified) | c2 | | | 1 | | | | | |
| material polysiloxane | c3 | | | | 1 | | | | |
| | c4 | | | | | 1 | | | |
| | c5 | | | | | | 1 | | |
| | c6 | | | | | | | 1 | |
| | c7 | | | | | | | | 1 |
| Viscosity at 25° C. (mPa · sec) | | 31 | 31 | 31 | 31 | 31 | 31 | 31 | 31 |
| Viscosity at 45° C. (mPa · sec) | | 13 | 13 | 13 | 13 | 13 | 13 | 13 | 13 |
| Viscosity at 60° C. (mPa · sec) | | 2 | 2 | 2 | 2 | 2 | 2 | 2 | 2 |
| Coating condition | Temp. at discharging head | 45° C. | 45° C. | 45° C. | 45° C. | 45° C. | 45° C. | 45° C. | 45° C. |
| Coating property | Pencil hardness of formed layer | HB | HB | HB | HB | HB | HB | HB | HB |
| | Omission | Bad | Good | Good | Good | Good | Good | Bad | Bad |

Adjustment and Evaluation Test of Inks of Examples 14 to 22 and Comparative Examples 14 to 22

The materials (a) to (c) shown in Table 16 were mixed at ratios (parts by weight) shown in each corresponding cell of

TABLE 16

| Material | | Ex. 14 | Ex. 14 | Ex. 15 | Ex. 16 | Ex. 17 | Ex. 18 | Ex. 19 | Ex. 20 |
|---|---|---|---|---|---|---|---|---|---|
| a (meth)acrylic acid ester | a1 | 50 | 50 | 50 | 65 | 50 | 70 | 50 | 60 |
| | a2 | | | | 10 | | | | |
| | a3 | | | | 25 | | | | |
| | a5 | 50 | 50 | 50 | 25 | 50 | | 50 | 40 |
| b polymerization initiator | | 15 | 15 | 15 | 15 | 15 | 15 | 15 | 15 |
| c Polyether- | c4 | 1 | | 0.2 | | | 0.5 | 0.2 | 0.2 |
| polysiloxane (modified) | c1 | | | | 0.5 | | | 0.2 | 0.2 |
| material polysiloxane | c8 | | | | | 0.5 | | | |

TABLE 16-continued

|  |  |  |  |  |  |  |  |  |
|---|---|---|---|---|---|---|---|---|
|  | c9 |  |  |  |  |  |  |  |
|  | c10 |  |  |  |  |  |  |  |
|  | c11 |  |  |  |  |  |  |  |
| Surface tension (mN/m)(25° C.) |  | 21 | 33.3 | 19.6 | 19.4 | 19.9 | 21.7 | 20.1 | 20.1 |
| Viscosity at 25° C. (mPa · sec) |  | 22.3 | 22.3 | 22.3 | 15.4 | 22.3 | 22.3 | 22.3 | 17.8 |
| Viscosity at 45° C. (mPa · sec) |  | 10.4 | 10.4 | 10.4 | 7.3 | 10.4 | 10.8 | 10.4 | 10 |
| Viscosity at 60° C. (mPa · sec) |  | *1 | *1 | *1 | *1 | *1 | *1 | *1 | *1 |
| Coating condition | Temp. at discharging head | 43° C. | 43° C. | 43° C. | 33° C. | 43° C. | 45° C. | 43° C. | 37° C. |
| Coating property | Pencil hardness of formed layer | HB | HB | HB | H | HB | 2H | HB | F |
|  | Omission | Good | Bad | Good | Good | Good | Good | Good | Good |

| Material |  | Ex. 21 | Ex. 22 | Comp. Ex. 15 | Comp. Ex. 16 | Comp. Ex. 17 | Ex. 4-1 | Ex. 5-4 | Ex. 10-1 |
|---|---|---|---|---|---|---|---|---|---|
| a (meth)acrylic acid ester | a1 | 70 | 50 | 50 | 50 | 0 | 45 | 25 | 40 |
|  | a2 |  |  |  |  |  | 5 | 5 |  |
|  | a3 |  |  |  |  |  |  |  | 40 |
|  | a5 | 30 | 50 | 50 | 50 | 100 | 50 | 70 | 20 |
| b polymerization initiator |  | 15 | 15 | 15 | 15 | 15 | 20 | 20 | 20 |
| c Polyether- polysiloxane (modified) material polysiloxane | c4 | 0.2 |  |  |  | 0.2 |  | 1 |  |
|  | c1 | 0.2 |  |  |  | 0.2 | 1 |  | 1 |
|  | c8 |  |  |  |  |  |  |  |  |
|  | c9 |  | 0.2 |  |  |  |  |  |  |
|  | c10 |  |  |  | 0.5 |  |  |  |  |
|  | c11 |  |  | 0.5 |  |  |  |  |  |
| Surface tension (mN/m)(25° C.) |  | 20.1 | 22.3 | 24.4 | 30.1 | 20.1 | 20.9 | 21 | 20.9 |
| Viscosity at 25° C. (mPa · sec) |  | 13.9 | 22.3 | 22.3 | 22.3 | 67.8 | 30 | 35 | 22 |
| Viscosity at 45° C. (mPa · sec) |  | 7 | 10.4 | 10.4 | 10.4 | 49.2 | 11 | 18 | 11 |
| Viscosity at 60° C. (mPa · sec) |  | *1 | *1 | *1 | *1 | 31.4 | *1 | 9 | *1 |
| Coating condition | Temp. at discharging head | 30° C. | 43° C. | 43° C. | 43° C. | Not dis- charged | 45° C. | 60° C. | 45° C. |
| Coating property | Pencil hardness of formed layer | H | HB | HB | HB | — | F | HB | H |
|  | Omission | Good | Fair | Bad | Bad | — | Good | Good | Good |

*1: Viscosity was not measured because inkjet discharging was possible at temperatures lower than the set temperature.
c8: polyether-modified polydimethyl siloxane (BYK-333, from Byk Chemie Japan Co.)
c9: polyether-modified polydimethyl siloxane (BYK-302, from Byk Chemie Japan Co.)
c10: aryalkyl-modified polymethyl alkyl siloxane (BYK-323, from Byk Chemie Japan Co.)
c11: aryalkyl-modified polymethyl alkyl siloxane (BYK-322, from Byk Chemie Japan Co.)

As seen in the results of Examples and Comparative Examples in Tables, ink omission occurred in a line manner corresponding to nozzles that had not discharged ink from a head and was also confirmed after curing.

By contrast, no line omission occurred in Examples where the polyether-modified polysiloxane materials of c1 to c5, c8, and c9 were added.

The ink omission portion formed in a line manner when the ink landed on a recording medium was quickly filled with the ink as the ink wet-spread, so that a uniform and solid layer was formed.

An ink omission portion was formed in a line manner immediately after the ink landed but a uniform and solid layer was obtained after being left undone for one minute. The wet spreading of the liquid to fill the line-like omission was significant when the surface tension of ink was low. When the surface tension of the ink at 25° C. was less than 22 mN/m, spreading of the liquid was particularly significant, thereby filling the line-like omission quickly to form a uniform and solid layer.

In addition, for any of the layers, it was confirmed that the ink was free from cracking upon processing. That is, the ink had excellent workability.

Since the same result was obtained for different kinds of polyether-modified polysiloxane compounds, it is good to select an optimal compound meeting with the required specification other than leveling or robustness of a layer.

Moreover, all of the photopolymerizable ink had faint odor and did not require any special care.

According to the present disclosure, an active energy ray curing type composition is provided which is free from skin sensitization problems, has compatibility between low viscosity and good robustness of a cured film, has no deficiency for ink omission upon ink application, and obtains uniform and excellent looking cured film.

In addition, the active energy ray curing type composition of the present disclosure has a faint odor, which is good in terms of handling. Coated matter obtained by using this active energy ray curing type composition is free from skin sensitization problems if a small amount of non-cured monomer components remains therein so that no skin allergy is caused when it is touched by finger, hands, etc. Therefore, high safety is ensured.

Furthermore, the active energy ray curing type composition of the present disclosure is free from cracking or chipping even when it is subject to processing such as punch-hole or cutting after a layer of the active energy ray curing type composition is formed on the surface of a product in the manufacturing process of housing, molded product, etc.

Having now fully described embodiments of the present invention, it will be apparent to one of ordinary skill in the art that many changes and modifications can be made thereto without departing from the spirit and scope of embodiments of the invention as set forth herein.

What is claimed is:

1. An active energy ray curing type composition comprising:
   (meth)acrylic acid ester; and
   polyether-modified polysiloxane,
   wherein (meth)acrylic acid ester comprises diethylene glycol dimethacrylate and alkoxy-modified (meth)acrylic acid ester,
   wherein the content of diethylene glycol dimethacrylate in the composition is from 20% to 80% by weight, and the content of alkoxy-modified (meth)acrylic acid ester in the composition is from 10% to 70% by weight.

2. The active energy ray curing type composition according to claim 1, having a surface tension of less than 22 mN/m at 25° C.

3. The active energy ray curing type composition according to claim 1, wherein a total of average polymerization degree of an alkoxy portion of alkoxy-modified (meth)acrylic acid ester is 9 or more.

4. The active energy ray curing type composition according to claim 1, wherein alkoxy-modified (meth)acrylic acid ester comprises at least one of caprolactone-modified dipenta erythritol hexaacrylate, ethylene oxide-modified trimethylol propane trimethacrylate, ethylene oxide-modified bisphenol A diacrylate, polypropylene glycol diacrylate, or ethylene oxide-modified pentaerythritol tetraacrylate.

5. The active energy ray curing type composition according to claim 1, wherein alkoxy-modified (meth)acrylic acid ester comprises at least one of caprolactone-modified dipenta erythritol hexaacrylate or ethylene oxide-modified trimethylol propane trimethacrylate and at least one of ethylene oxide-modified bisphenol A diacrylate, polypropylene glycol diacrylate, or ethylene oxide-modified pentaerythritol tetraacrylate.

6. The active energy ray curing type composition according to claim 1, wherein a content of polyether-modified polysiloxane surpasses 0.1 parts by weight per 100 parts by weight of (meth)acrylic acid ester.

7. A container to accommodate the active energy ray curing type composition of claim 1.

8. A discharging device comprising:
   the container of claim 7.

9. Cured matter formed by using the active energy ray curing type composition of claim 1.

10. The active energy ray curing type composition according to claim 1, wherein the active energy ray curing type composition is negative in skin sensitization.

11. An active energy ray curing type composition comprising:
    (meth)acrylic acid ester; and
    polyether-modified polysiloxane,
    wherein (meth)acrylic acid ester comprises diethylene glycol dimethacrylate and alkoxy-modified (meth)acrylic acid ester,
    wherein polyether-modified polysiloxane is represented by the following chemical formula 1:

$$(CH_3)_3Si-O-[Si(CH_3)_2-O)]a-[Si(CH_3)(X)-O]b-Si(CH_3)_3$$ Chemical formula 1 where X represents $R(C_2H_4O)c(C_3H_6O)d$-R', where R represents a single bond or an alkylene group, R' represents a hydrogen atom or an alkyl group, a to d each, represent average polymerization degree including a case of c or d being 0.

12. The active energy ray curing type composition according to claim 11, wherein the active energy ray curing type composition is negative in skin sensitization.

13. A container to accommodate the active energy ray curing type composition of claim 11.

14. A discharging device comprising:
    the container of claim 13.

15. Cured matter formed by using the active energy ray curing type composition of claim 11.

16. An active energy ray curing type composition comprising:
    (meth)acrylic acid ester; and
    polyether-modified polysiloxane,
    wherein (meth)acrylic acid ester comprises diethylene glycol dimethacrylate and alkoxy-modified (meth)acrylic acid ester,
    wherein a cured film has a pencil scratch hardness of F or higher as measured according to JIS-K-5600 when the cured film is formed by irradiating a coated film of the active energy ray curing type composition having a thickness of about 40 μm with an amount of light of 1.2 J/cm² with an illuminance of 0.3 W/cm² in a wavelength range corresponding to the ultraviolet A range.

17. The active energy ray curing type composition according to claim 16, wherein the active energy ray curing type composition is negative in skin sensitization.

18. A container to accommodate the active energy ray curing type composition of claim 16.

19. A discharging device comprising:
    the container of claim 18.

20. Cured matter formed by using the active energy ray curing type composition of claim 16.

* * * * *